United States Patent Office 3,378,577
Patented Apr. 16, 1968

3,378,577
METHOD FOR MANUFACTURING PURIFIED BIS-($\beta$-HYDROXYETHYL)TEREPHTHALATE
Tadao Tsutsumi, Mishima-shi, Japan, assignor to Toyo Rayon Kabushiki Kaisha, Tokyo, Japan
No Drawing. Filed Apr. 20, 1964, Ser. No. 361,241
Claims priority, application Japan, Apr. 30, 1963, 38/22,188
2 Claims. (Cl. 260—475)

ABSTRACT OF THE DISCLOSURE

The invention relates to the production of substantially nitrogen-free, relatively colorless bis($\beta$ - hydroxyethyl) terephthalate. More specifically, the invention relates to a process of purifying bis($\beta$-hydroxyethyl)terephthalate obtained by reacting terephthalonitrile, ethylene glycol and water by contacting the bis($\beta$-hydroxyethyl)terephthalate with liquid chloroform.

---

This invention concerns the manufacture of polyethylene terephthalate from bis($\beta$-hydroxyethyl)terephthalate and the purification of bis($\beta$-hydroxyethyl)terephthalate obtained by reacting terephthalonitrile, ethylene glycol and water.

It is known that polycondensation of bis($\beta$-hydroxyethyl)terephthalate produces polyethylene terephthalate. The present commercial production of bis($\beta$-hydroxyethyl)terephthalate mainly consists of ester exchange between a low alkyl ester of terephthalate such as dimethyl terephthalate and ethylene glycol or direct esterification of terephthalic acid with ethylene glycol. In addition it is also known to produce bis($\beta$-hydroxyethyl)terephthalate in a single step by reacting terephthalonitrile, ethylene glycol and water as indicated by the reaction Formula I below:

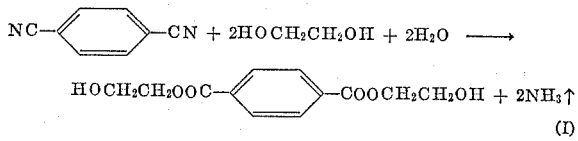

(I)

A one-step synthesis of terephthalonitrile has been developed in recent years which comprises gas-phase air oxidation of p-xylene in the presence of ammonia. Thus the manufacture on an industrial scale of polyethylene terephthalate involving the steps, p-xylene-terephthalonitrile - bis($\beta$-hydroxyethyl)terephthalate - polyethylene terephthalate, has attracted much attention, but despite its apparent advantages, the polyethylene terephthalate produced is appreciably coloured and extremely unsatisfactory as a commercial commodity.

The synthesis of bis($\beta$-hydroxyethyl)terephthalate from terephthalonitrile, ethylene glycol and water by the aforesaid reaction Formula I is preferably carried out as described in British Patent No. 800,875; terephthalonitrile is mixed with 5 to 10 mol of ethylene glycol and 1 mol of water per mol of the nitrile group, and the reaction is carried out at a temperature high enough to expel the generated ammonia out of the system (above 150° C.). The catalysts which may be used in this reaction include weak acid salts, hydroxides and alcoholates of alkali metals or alkaline earth metals and basic compounds such as pyridine or ammonia. Other catalysts which may be used are oxides or salts of metals of the Group II–B in the Periodic Table and oxides or salts of manganese, cobalt, nickel or copper.

Whichever catalyst is used in the above reaction, the reaction liquid turns yellow or yellowish brown as the reaction proceeds and the terephthalonitrile is not fully converted into bis($\beta$-hydroxyethyl)terephthalate. When the liquid cooled after completion of reaction bis($\beta$-hydroxyethyl)terepthalate crystallises out, the remaining liquid consisting mainly of excess ethylene glycol. When polyethylene terephthalate was produced from the bis($\beta$-hydroxyethyl)terephthalate obtained, for example, by polycondensation in the presence of antimony catalyst under substantial vacuum and a temperature of 270 to 280° C., the polycondensate was unavoidably subject to considerable colouring, despite the use of an anti-colouring agent such as triphenyl phosphate.

The addition of an anti-colouring agent, for example, phosphoric and phosphorous acids, salts or esters thereof, and sulphur or sulphur containing compound such as thiophenol, thio acid and ammonium sulphate during the above reaction permits the production of seemingly almost colourless bis($\beta$-hydroxyethyl)terephthalate. Polycondensation of this material under substantial vacuum and at a temperature of 270 to 280° C. resulted in a brownish polymer however.

According to the present invention, it is possible to produce substantially colourless polyethylene terephthalate by purifying the bis($\beta$-hydroxyethyl)terephthalate used in its manufacture by contacting it with liquid chloroform.

According to one aspect of the present invention there is provided a method of purifying bis($\beta$-hydroxyethyl)terephthalate obtained by reacting terephthalonitrile, ethylene glycol and water which comprises contacting the bis-($\beta$-hydroxyethyl)terephthalate with liquid chloroform.

According to a further aspect of the invention there is provided a process for manufacturing polyethylene terephthalate which comprises contacting bis($\beta$-hydroxyethyl)terephthalate obtained by reacting terephthalonitrile, ethylene glycol and water with liquid chloroform, separating the bis($\beta$-hydroxyethyl)terephthalate and polymerising it to polyethylene terephthalate.

Heretofore no other suggestion regarding the purifying method of bis($\beta$-hydroxyethyl)terephthalate synthesised from terephthalonitrile has even been proposed, nor has the process of producing polyethylene terephthalate from bis($\beta$-hydroxyethyl)terephthalate purified by the above-mentioned process.

The crude bis($\beta$-hydroxyethyl)terephthalate obtained by reaction of terephthalonitrile, ethylene glycol and water may be reacted with chloroform in any way which ensures that the materials are brought together in intimate contact. For example, it may be mixed with chloroform, suspended therein, preferably with stirring, or the chloroform may be passed through layers of the terephthalate. The temperature employed may be between about −10° C. and below the boiling point of chloroform. Preferably, the reaction is carried out at room temperature for economic reasons. The amount of chloroform used is not critical, the particular amounts employed depending largely on the contact method adopted. Generally, however, preferable amounts are 0.1 to 10 parts by weight to 1 part of bis($\beta$-hydroxyethyl)terephthalate. The purification is fully attained in a short time, several minutes usually being sufficient. After being contacted with chloroform, the terephthalate is separated, for example by pressurized filtration, suction filtration or centrifugal separation. The chloroform may be used repeatedly since when its purifying function has deteriorated it may be regenerated by, for example, distillation.

Manufacture of polyethylene terephthalate from the purified bis($\beta$-hydroxyethyl)terephthalate is effected by heating it to a temperature higher than the melting point of polyethylene terephthalate produced under substantial vacuum, but not in excess of 300° C., in the presence of known polymerisation catalysts such as cadmium, zinc, manganese, cobalt, antimony or lead. The polymer produced is practically colourless and has the same or a finer shade of colour than that of polyethylene terephthalate commercially produced by thermally condensing purified bis(β-hydroxyethyl)terephthalate under substantial vacuum. It is suitable for use in the manufacture of fibre, film and other molded products.

The invention is illustrated in the following examples.

EXAMPLE 1

100 g. of terephthalonitrile, 977 g. of ethylene glycol, 60 g. of water, 0.5 g. of zinc acetate, and 0.5 g. of trimethyl phosphate were charged into a 2,000 ml. three-necked flask provided with a reflux condenser, stirrer, and nitrogen feed pipe. Water-saturated nitrogen was introduced via the feed pipe whilst the flask was heated in an oil bath at 200° C. under reflux. The ammonia generated was discharged from the farthest end of the reflux condenser into a 1,000 ml. bottle containing 4 N sulphuric acid for absorption. After reaction, the rate of ammonia conversion was computed by back titration with 1 N-sodium hydroxide solution.

After reflux heating for 5 hours, the conversion rate was 85.4% and the reaction liquid was tinted light yellow. The liquid was cooled to precipitate crystals and when ethylene glycol was separated by suction filtration, white bis(β-hydroxyethyl)terephthalate was obtained. This bis(β-hydroxyethyl)terephthalate presented a Haesen value of 80 when melted at 150° C. to determine the degree of colouring. 40 g. of the terephthalate, 0.16 g. of antimony oxide as polymerisation catalyst, and 0.04 g. of triphenyl phosphate as anti-colouring agent were introduced into a flask with a side arm and the mass was polymerised by stirring for 2 hours under a reduced pressure of 0.1 to 0.3 mm. Hg and at a temperature of 275° C. A yellowish brown polymer was produced.

The nitrogen content of the aforesaid bis(β-hydroxyethyl)terephthalate, as determined by the Coleman nitrogen analyser, was 0.67%. After once recrystallising with water, the nitrogen content was found to be only slightly reduced to 0.60%.

EXAMPLE 2

Bis(β-hydroxyethyl)terephthalate obtained as in Example 1 was separated from ethylene glycol, suspended in chloroform, and then separated from it by suction filtration after thorough stirring at room temperature. When it was melted at 150° C. to determine the degree of colouring the Haesen value was 20. The nitrogen content of the terephthalate thus treated was measured by the same Coleman nitrogen analyser as was used in Example 1 and the value indicated was 0%. The terephthalate was decomposed by melting with sodium metal and subjected to the ordinary qualitative test for nitrogen using an acid solution of ferrous sulphate. The result also proved negative.

The bis(β-hydroxyethyl)terephthalate was polymerised in the same way as in Example 1 and a colourless clear polymer was obtained.

EXAMPLE 3

Using the same apparatus as was used in Example 1 a reaction mixture consisting of terephthalonitrile (100 g.), ethylene glycol (977 g.), water (60 g.), catalyst (0.5 g.), and 0.5 g. of an anti-colouring agent, was heated at a bath temperature of 200 to 220° C. for 5 hours.

The ammonia conversion rate, colour of reaction mixture after 5 hours and the degree of colouration of the bis(β-hydroxyethyl)terephthalate treated with chloroform and the polymer produced therefrom, using various catalysts and anti-colouring agents, are shown in Table 1. The degrees of colouration shown are Haesen values obtained by measuring bis(β-hydroxyethyl)terephthalate melted at 150° C. and by measuring an 8% solution of the polymer in o-chlorophenol.

TABLE 1

| Catalyst | Anti-Colouring Agent | Conversion Rate (percent) | Colour of Reaction Liquid | Degree of Colouration after Chloroform Treatment | Degree of Colouration of Polymer |
| --- | --- | --- | --- | --- | --- |
| Sodium acetate | Triphenyl phosphate | 65.8 | Light yellow | 30 | 20 |
| Zinc carbonate | do | 82.4 | do | 40 | 40 |
| Cobalt acetate | Dibenzyl sulphide | 86.8 | Yellow | 60 | 40 |
| Cadmium acetate | Sodium hydrogen sulphite | 92.2 | do | 70 | 50 |
| Zinc acetate | Tricalcium phosphate | 90.9 | Light yellow | 20 | 10 |
| Do | Thiophenol | 95.5 | do | 20 | 20 |

The following is an attempt to explain the mechanism of the purification of this invention and is not intended to limit the scope of the invention in any way.

The fact that almost colourless bis(β-hydroxyethyl)terephthalate gives rise to coloured polymers and that bis(β-hydroxyethyl)terephthalate purified with chloroform does not, indicates that the colour producing impurity is soluble in chloroform.

As the result of extensive study of this problem, it appears that one of the reasons for the colouring of polyethylene terephthalate may be accounted for by the fact that during the reaction of terephthalonitrile, ethylene glycol and water, nitrogen-containing reaction intermediates having the following structures are produced and that small amounts of such compounds are entrained into bis(β-hydroxyethyl)terephthalate.

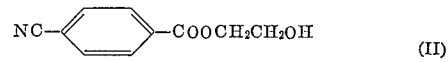
(II)

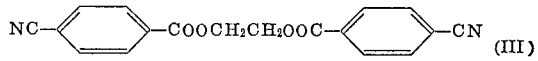
(III)

The mechanism by which the nitrogen-containing compounds act on the colouring of polyethylene terephthalate is not clear. It is however, a well-known fact that if free amine is used in the preparation of polyesteramide colouring takes place, see, for instance, J. Am. Chem. Soc., 82, 3640 (1960). While the materials having the above-mentioned structures of II and III entrained in bis(β-hydroxyethyl)terephthalate are not free amines, various nitrogen-containing compounds, including ammonia, are produced by the reaction of the materials and are supposed to be associated with the colouring of polyethylene terephthalate by the same mechanism that occurs in the colouring of polyesteramide. The compounds having the structures of II and III are considerably soluble in chloroform even at low temperatures such as room temperature, whereas bis(β-hydroxyethyl)terephthalate has an extremely small solubility in chloroform (0.54 g./100 g.) at room temperature.

What we claim is:

1. A method of purifying bis(β-hydroxyethyl)terephthalate obtained by reacting terephthalonitrile, ethylene glycol and water which comprises the step of contacting the bis(β-hydroxyethyl)terephthalate with liquid chloroform at a temperature of from about −10° C. up to the boiling point of the chloroform.

2. A method of purifying nitrogen-contaminated bis(β-hydroxyethyl)terephthalate obtained by reacting terephthalonitrile, ethylene glycol and water which comprises contacting the bis(β-hydroxyethyl)terephthalate with liquid chloroform at a temperature of from —10° C. to up to the boiling point of chloroform in a proportion of from about 0.1 to 10 parts by weight of chloroform for each part by weight of bis(β-hydroxyethyl)terephthalate, and recovering the latter in substantially nitrogen-free form from the treatment mixture.

References Cited

UNITED STATES PATENTS

| | | | |
|---|---|---|---|
| 2,465,319 | 3/1949 | Whinfield, et al. | 260—75 |
| 2,921,088 | 1/1960 | Gasson et al. | 260—475 |

WILLIAM H. SHORT, *Primary Examiner.*

R. T. LYON, *Assistant Examiner.*